Feb. 27, 1962   N. L. CARR   3,023,256
PROCESS FOR ISOMERIZING NORMAL HEXANE
Filed Dec. 23, 1959
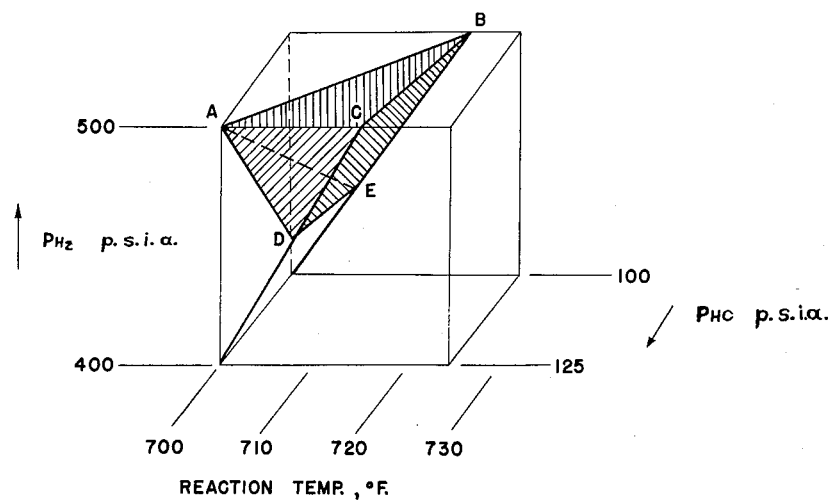
INVENTOR.
NORMAN L. CARR
BY
ATTORNEY United States Patent Office 3,023,256
Patented Feb. 27, 1962

3,023,256
PROCESS FOR ISOMERIZING NORMAL HEXANE
Norman L. Carr, Allison Park, Pa., assignor to The Pure Oil Company, Chicago, Ill., a corporation of Ohio
Filed Dec. 23, 1959, Ser. No. 861,604
6 Claims. (Cl. 260—683.68)

This invention relates to new and useful improvements in processes for the isomerization of n-hexane containing small amounts of other hydrocarbons as impurities. It is more specifically concerned with the production of isohexane from n-hexane containing 20–35% vol. of other hydrocarbons consisting essentially of cyclohexane and methylcyclopentane, under conditions which result in the production of isohexane at a maximum rate and at a substantially zero aging rate for the catalyst used. More particularly, the process is concerned with the isomerization of a crude n-hexane feed using a catalyst consisting of 0.50–0.75% wt. palladium on silica-alumina (containing 70–90% silica) and containing 0–5% combined fluorine using conditions of temperature and partial pressures of hydrogen and hydrocarbon feed which produce a maximum reaction rate and a substantially zero aging rate for the catalyst.

Isomerization has recently come into prominence as a unit process in the petroleum industry for conversion of n-pentane and/or n-hexane into branch-chain isomers which are substantially enhanced in octane number. In the copending applications of Hillis O. Folkins et al., Serial No. 765,814, filed October 7, 1958; Serial No. 765,815, filed October 7, 1958; now U.S. 2,943,129, and Serial No. 765,482, filed October 6, 1958, now U.S. 2,943,128, there are disclosed processes for isomerization of n-pentane or n-hexane which produce the desired branch-chain isomers in high yield using a catalyst consisting of a small amount of palladium supported on an acidic silica-alumina hydrocarbon cracking catalyst containing 1–5% fluorine added in the form of hydrofluoric acid or a fluorinated $C_2$–$C_5$ aliphatic acid of ammonium fluoride, or precipitated within the catalyst support in the form of aluminum fluoride or zirconium fluoride. In the copending application of Hillis O. Folkins et al., Serial No. 691,996, filed October 23, 1957, there is described an isomerization process which utilizes a palladium on silica-alumina catalyst. The isomerization process using these catalysts is highly selective for the formation of isoparaffins in high yield. It has been reported in said copending applications that the palladium on silica-alumina catalysts (with or without fluorine) are effective in the isomerization of individual paraffin hydrocarbons and by suitable compromise of process conditions can be used for isomerization of mixtures of $C_4$–$C_7$ normal paraffin hydrocarbons.

I have previously reported in my paper, "Kinetics of Catalytic Isomerization of n-Pentane" read before the Division of Petroleum Chemistry at the April 1959 meeting of the American Chemical Society, that for any specific combination of catalyst, reaction temperature, and n-pentane feed stock composition, there is an optimum total pressure at which maximum isomerization rate is obtained at each hydrogen/hydrocarbon ratio. A similar relationship exists in the isomerization of n-hexane. However, many of the maximum isomerization reaction rates are accompanied by uneconomically high catalyst fouling rates because, in general, both rates are increased by increasing the same reaction variables, viz, temperature, hydrocarbon partial pressure, molecular weight of the feed stock, and naphthene concentration in the feed stock. Therefore, the inclusion of small amounts of naphthenes such as cyclohexane and methylcyclopentane in a n-hexane feed tends to produce a rapid fouling or aging of the isomerization catalyst. Palladium on silica-alumina catalysts are very active in promoting the isomerization process, but are sensitive to minor changes in process variables and tend to foul or age at elevated temperatures and high hydrocarbon partial pressures. The fluorine-containing palladium or silica-alumina catalysts have a much higher initial activity for promoting the isomerization process, but are much more sensitive to fouling or aging at elevated temperatures, high hydrocarbon partial pressures, and even moderate concentrations of naphthenes in the feed stock. The catalyst aging rate is also affected by the catalyst pellet size and the palladium metal content.

It is therefore one object of this invention to provide a new and improved process for the isomerization of a n-hexane feed contining 20–35% vol. of other hydrocarbons as impurities.

Another object of this invention is to provide an improved catalytic isomerization process for use with an impure n-hexane feed in which the decline of catalytic activity is effectively mitigated.

A further object of this invention is to isomerize an impure n-hexane feed using a palladium on silica-alumina catalyst (with or without combined fluorine) under conditions which produce an optimum isomerization reaction rate and substantially zero aging of the catalyst.

A feature of this invention is the provision of an improved isomerization process using a palladium on silica-alumina catalyst (with or without combined fluorine), in which hydrogen and an impure n-hexane feed are passed over the catalyst at conditions of temperature, hydrogen pressure, and hydrocarbon pressure lying within the shaded portion of the three-dimensional graph set forth in the drawing.

Another feature of this invention is the provision of an improved isomerization process in which a sulfur-free n-hexane feed containing 20–35% vol. hydrocarbon impurities, which has been totally desulfurized, and hydrogen are passed over a catalyst consisting of 0.50–0.75% palladium on silica-alumina containing 0–5% combined fluorine, at conditions of temperature, hydrogen pressure, and hydrocarbon pressure lying within the shaded portion of the drawing.

Still another feature of this invention is the provision of an improved isomerization process using a palladium on silica-alumina catalyst in which catalyst pellets are used of a size and metal content which are highly resistant to aging and have a high activity for formation of isoparaffins.

Other objects and features of this invention will become apparent from time to time throughout the specification and claims as hereinafter related.

In the accompanying drawing, to be taken as part of the specification, there is shown a three-dimensional graph illustrating temperature, hydrogen pressure, and hydrocarbon pressure for a n-hexane isomerization process using a palladium on silica-alumina catalyst (with 0–5% combined fluorine) and in which the shaded portion A—B—C—D—E defines the range of temperatures and pressures in which the isomerization reaction rate is a maximum and the catalyst aging rate is substantially zero.

This invention consists essentially of a process for the isomerization of n-hexane containing 20–35% vol. of other hydrocarbons consisting essentially of cyclohexane and methylcyclopentane and minor amounts of heptanes as impurities. The crude or impure hexane feed treated in this process has a naphthene content representing the concentration which would normally be present in a crude hexane cut used as feed to an isomerization process. The n-hexane feed is first subjected to a desulfurization process, such as catalytic hydrodesulfurization, optionally including caustic and water-washing and drying of the effluent, or stabilization, to reduce the sulfur content to the range of about 5–50 p.p.m. This n-hexane feed is heated to an elevated temperature, preferably about 400°–800° F. (although higher temperatures may be used), and passed through a desulfurization reactor, also known as a "guard case," containing a suitable desulfurizing reactant to fix and remove the sulfur without release of hydrogen sulfide. Desulfurizing materials which are well known in the art for this purpose include various metals, such as copper, nickel, iron, molybdenum, and cobalt and their oxides and various compounds thereof, such as copper on silica, silica-alumina, or alumina. This chemical treatment usually reduces the sulfur content of the feed to less than about 1 p.p.m. and may produce a sulfur content of practically zero. The completely desulfurized hydrocarbon feed is then passed to the isomerization reactor with free hydrogen for contact with the isomerization catalyst at the reaction temperature and hydrogen and hydrocarbon pressures which are in the range suitable for conversion of n-hexane to isohexane. The isomerization reactor contains a catalyst which consists of 0.50–0.75% palladium on silica-alumina (containing 70–90% silica) and containing 0–5% combined fluorine. These catalysts are prepared in the manner described in the aforementioned copending applications of Folkins et al.

When the n-hexane feed is processed under mild conditions which result in a relatively low reaction rate, there is usually no problem of catalyst fouling. However, when the temperature and pressure of hydrogen and hydrocarbon are adjusted to produce a maximum isomerization rate, there is a marked tendency for the catalyst to decline in activity. The catalysts containing 0.5–0.75% wt. palladium on silica-alumina (70–90% silica), containing 0–5% combined fluorine, are more active than catalysts containing less palladium and are more resistant to aging. Catalysts containing a higher proportion of palladium are not appreciably more active and are actually less selective for formation of the desired isoparaffins. Catalysts which are formed or broken into 1/16" pellets are much more resistant to aging than 1/4" or 1/8" catalyst pellets. Smaller catalyst pellets are impractical as they tend to be entrained by the feed at high flow rates and also increase the resistance of the reactor by a substantial amount. Several experiments were therefore carried out in an attempt to determine the conditions, if any, at which it would be possible to obtain a high isomerization rate with little or no fouling of the catalyst.

The following non-limiting examples illustrate the scope of this invention and define the combination of conditions which have been found necessary for use in the isomerization of n-hexane containing substantial amounts of naphthenes to produce a high isomerization rate with little or no catalyst fouling.

EXAMPLE I

A 0.65% wt. palladium on 75/25 silica-alumina catalyst, containing 2% combined fluorine, was prepared by impregnating a precalcined 75/25 silica-alumina hydrocarbon cracking catalyst with a solution of palladium chloride and hydrofluoric acid sufficient to produce the desired concentration of palladium and fluorine in the catalyst. The impregnated catalyst thus produced was extruded through a 1/8" die and the extrudate cut into 1/8" pellets which were broken in half to form 1/16" catalyst pellets. The catalyst thus produced was reduced with hydrogen at a temperature of 750°–975° F. to produce a highly active catalyst of the desired composition. This procedure for the preparation of the catalyst is described in considerable detail in the aforementioned copending applications of Hillis O. Folkins et al. In preparing the fluorine-containing catalyst, ammonium fluoride or a fluorinated aliphatic acid, such as trifluoroacetic acid, may be substituted for the hydrofluoric acid, or aluminum fluoride or zirconium fluoride may be precipitated within the catalyst support. The catalyst which was produced in the above-described manner (with HF) was used in carrying out a number of experimental tests for catalyst aging and isomerization reaction rate under different reaction conditions. In each case, the hydrocarbon feed consisted of about 70% n-hexane, 25% cyclohexane, and the remainder being methylcyclopentane, benzene, isohexane, and isopentane. The naphthene concentration used was that which would be encountered in a crude n-hexane feed. The hydrocarbon feed was desulfurized to a sulfur content less than about 1 p.p.m., as described above, using a "guard case" containing a desulfurization reactant consisting of 15% reduced nickel molybdate on 75/25 silica-alumina. The desulfurized hexane feed was circulated over the catalyst in an isomerization reactor for extended periods of time, up to about 100 hours, at different conditions of pressure, hydrogen/hydrocarbon ratio, and reaction temperature. In each experiment, the yield of isohexane was noted initially and after an extended period of time to determine the aging rate of the catalyst, which is expressed in decrease of yield percent per 100 hours of process operation. The reaction rate constant for the process under the conditions used was calculated according to the equation, $$K = (\text{LWHSV}) \ln \left[ \frac{1}{1 - \frac{x}{73.5}} \right]$$

where LWHSV is the liquid weight hourly space velocity and $x$ is the percent yield of isohexane (including all isomers). The rate constant K provides a basis for comparison of catalyst activity and resistance to aging under different conditions of temperature, space velocity, etc.

A mixture of hydrogen and the crude n-hexane feed was passed over the catalyst (0.65% palladium on 75/25 silica-alumina, containing 2% combined fluorine) at a temperature of 703° F. and liquid weight hourly space velocity of 4.0 for a period of 139 hours. The hydrogen partial pressure was 500 p.s.i.a. and the hydrocarbon partial pressure was 100 p.s.i.a. The initial yield of isohexane was 69.0%, which remained constant throughout the entire 139 hour run. The reaction rate constant for the process under these conditions is 11.4, while the aging rate for the catalyst is zero.

In another run, a mixture of hydrogen and the crude n-hexane feed was passed over the same catalyst at a temperature of 737° F. and liquid weight hourly space velocity of 6.03 for a period of 94 hours. The hydrogen partial pressure was 500 p.s.i.a. and the hydrocarbon partial pressure was 100 p.s.i.a. The initial yield of isohexane was 69.3% and the final yield was 56.7%. The reaction rate constant for the process under these conditions was initially 17.7 but declined to a value of 9.1, while the aging rate for the catalyst was 10% decline per 100 hours of process operation.

EXAMPLE II

A number of additional runs using the same catalyst and the same impure n-hexane feed as in Example I were carried out in which the temperature and partial pressures of hydrogen and the hexane feed varied and determinations were made of the rate constant K and the aging rate for the catalyst under the isomerization conditions used. These data were obtained in a planned experimental program based on the so-called "steepest ascent" technique which enabled me to determine the conditions at which maximum isomerization rate is obtained, together with a substantially zero aging rate. In Table I, there are set forth in tabular form the rate constants and aging rate for different hydrogen and hexane feed partial pressures and different isomerization reaction temperatures. These data are analyzed mathematically according to the "steepest ascent" technique and expressed graphically in the drawing which shows a shaded region of temperature and hydrogen and hydrocarbon partial pressures as being the region of maximum isomerization reaction rate and substantially zero catalyst aging rate.

This shaded region, defined by points A—B—C—D—E represents the region in which the isomerization rate constants lie in the range from about 9 to 12 and the catalyst aging rate is substantially zero. In Table I, from which the drawing is derived, the reaction rate constant K is shown in the left of each column and the aging rate is set forth in parentheses expressed as decline in yield percent per 100 hours of process operation.

TABLE I

*0.65% Palladium on 75/25 Silica-Alumina+2% Combined Fluorine (as HF)*

[Rate Constant K and Aging Rate (−ΔY/100 hr.)]

| Partial pressure p.s.i.a. | | Temperature °F. | | | | |
|---|---|---|---|---|---|---|
| Hydrogen | Hydrocarbon | 690 | 700 | 710 | 725 | 735 |
| 500 | 100 |  |  |  |  | 17.7(10) |
| 500 | 125 |  | 9.0(0.46) | 10.5(0) | 12.3(1.0) |  |
| 450 | 115 | 7.0(0.5) |  | 9.5(0) |  | 15.0(30) |
| 450 | 100 |  | 8.3(0.5) | 9.0(0) |  |  |
| 450 | 125 |  |  | 9.2(0) |  |  |
| 400 | 125 | 6.5(1.5) | 7.5(0.5) |  | 10.4(8) |  |
| 400 | 100 | 6.0(1) | 6.9(0.5) |  | 9.8(7) |  |

EXAMPLE III

When an isomerization catalyst is prepared consisting of 0.65% wt. palladium on 78/13 silica-alumina containing 2% combined fluorine and used in the isomerization of a crude n-hexane feed stock, as in the previous examples, the maximum rate constant for the reaction is not significantly different from the catalyst using a 75/25 silica-alumina support. When this catalyst is used in the isomerization of the crude n-hexane feed, it is found that the reaction rate is at a maximum ($K=8-12$) and the aging rate is substantially zero when the process conditions are maintained within the shaded region A—B—C—D—E of the drawing. The data which I have obtained show that outside the range of conditions indicated by the shaded region of the drawing, there is either excessive aging of the catalyst or an uneconomically low reaction rate for the process.

EXAMPLE IV

When palladium on silica-alumina catalysts are prepared using palladium concentrations in the range from 0.50 to 0.75% wt., it is found that there is relatively little change in catalyst activity with palladium concentration. If the rate constant K in a hexane isomerization process is plotted against palladium concentration on a silica-alumina support, it is found that "K" increases linearly with the metal constant in the range from zero to about 0.60% wt. palladium. "K" reaches a maximum at about 0.65–0.70% wt. palladium and decreases at higher palladium concentrations. This relationship holds for the non-fluorided and the fluorided catalysts. The improvement in initial catalyst activity which is obtained by addition of fluorine to the catalyst, is substantially the same whether the fluorine is added in the form of ammonium fluoride, hydrofluoric acid, trifluoroacetic acid, ammonium fluoride, or zirconium fluoride. While it has been found that the combination of conditions of temperature and hydrogen and hydrocarbon partial pressures is somewhat unique for a particular hexane feed containing a small amount of naphthenic impurities with respect to a particular catalyst composition, still the range of conditions required does not vary substantially for catalysts of the same activity, particularly in the region of maximum activity. Therefore, catalysts in the range from 0.50 to 0.75% wt. palladium on silica-alumina, containing 70–90% silica, vary slightly in activity with metal constant but have optimum reaction rate and substantially zero aging rate within the shaded area of the drawing. It Table II, there are set forth the reaction rate constants and catalyst aging rates for temperatures in the range from 690° to 730° F. and different hydrogen and hydrocarbon feed partial pressures for catalysts of different palladium concentrations and different forms of combined fluorine. In the table it should be noted that the reaction rate constants and the catalyst aging rates correspond to the values within the shaded areas of the drawing where a maximum reaction rate and a substantially zero aging rate are obtained.

TABLE II

*Palladium on 75/25 Silica-Alumina with 2% Combined Fluorine*

[Rate Constant K and Aging Rate (−ΔY/100 hr.)]

| Catalyst, percent Pd. | Reaction conditions | | | | | |
|---|---|---|---|---|---|---|
|  | Form of added fluorine | Temp. °F. | H₂ p.s.i.a. | HC feed p.s.i.a. | K | −ΔY/100 hr. |
| 0.65 | HF | 725 | 500 | 125 | 12.3 | 1.0 |
| 0.65 | NH₄F | 725 | 500 | 125 | 12.4 | 1.0 |
| 0.65 | CF₃COOH | 710 | 500 | 125 | 10.5 | 0 |
| 0.65 | AlF₃ | 690 | 400 | 125 | 6.6 | 1.5 |
| 0.65 | ZrF₄ | 700 | 450 | 100 | 8.3 | 0.5 |
| 0.5 | HF | 715 | 500 | 125 | 8.7 | 0 |
| 0.5 | HF | 720 | 500 | 100 | 8.3 | 0 |
| 0.5 | HF | 710 | 450 | 110 | 7.5 | 0 |

EXAMPLE V

When catalysts were prepared consisting of 0.50–0.75% palladium on silica-alumina (75/25 or 87/13) containing no fluorine, it has been found that the isomerization reaction rate constant K does not vary markedly. "K" varies linearly with palladium content in the range from zero to 0.60% wt., reaches a maximum at palladium concentrations of 0.65–0.70%, and declines at higher concentrations. The initial catalyst activity is much less than that of the fluorine-containing catalysts, but the non-fluorided catalysts are more stable for long runs. The combination of conditions of temperature and pressures lying within the shaded region of the drawing is necessary when using the non-fluorided catalysts to obtain maximum activity and a substantially zero aging rate. In Table III, there are set forth reaction rate constants and catalyst aging rates for non-fluorided, palladium on silica-alumina catalysts.

TABLE III

*0.65% Palladium on 87/13 Silica-Alumina*

[Rate Constant K and Aging Rate (−ΔY/100 hrs.)]

| Partial pressure p.s.i.a. | | Temperature °F. | | | | |
|---|---|---|---|---|---|---|
| Hydrogen | Hydrocarbon | 690 | 700 | 710 | 725 | 735 |
| 500 | 125 | 3.2(0.21) | 4.0(0) |  |  | 6.1(10) |
| 450 | 100 |  |  |  | 3.5(1) | 5.2(4.4) |
| 360 | 120 |  | 5.1(2) |  |  | 8.2(13) |
| 410 | 115 |  | 4.1(0) |  |  |  |
| 450 | 125 | 3.0(0.5) | 3.8(0) |  |  |  |

EXAMPLE VI

When palladium on silica-alumina catalysts are prepared in different sizes and in different palladium concentrations, it is found that there is a definite relationship between catalyst pellet size, palladium concentration, and resistance to aging. These catalysts increase in resistance to aging with decrease in catalyst pellet size and with increase in palladium concentration up to about 0.75% wt. Thus, catalyst pellets of ⅛" diameter are more resistant to aging than pellets of ¼" diameter, and 1/16" pellets (extruded and cut into short lengths, or formed by breaking ⅛" pellets in half) are even more resistant to aging. Similarly, catalysts containing more than 0.50% wt. palladium are more resistant to aging than catalysts containing lesser amounts of palladium. The differences in aging due to size and palladium concentration are most apparent under conditions of temperature and pressure which are conducive to catalyst aging, the larger pellets having lower palladium content aging more rapidly. Under conditions of temperature and pressure, where aging is slight, the difference in size between 1/8" and 1/16" pellets and the difference in palladium concentration between 0.35% and 0.65% may be sufficient to prevent aging completely. In Table IV, calculated aging rates are set forth for catalysts of different size and palladium concentration under conditions which are conducive to moderate aging.

TABLE IV

Feed: n-$C_6H_{14}$—73%; cy-$C_6H_{12}$ and other naphthenes 27%.
Reaction conditions: 735° F.; 3.0 LWHSV; $H_2$—500 p.s.i.a.; hydrocarbon—100 p.s.i.a.
Catalyst support: 75/25 silica-alumina+2% HF.

| Percent Pd. | Particle size, inches | Aging rate, $-\Delta Y/100$ hr. |
|---|---|---|
| 0.35 | 1/8 pellets | 6 |
| 0.35 | 1/8 extrudate | 4 |
| 0.35 | 1/16 cracked pellets | 1.5 |
| 0.35 | 1/16 extrudate | 1.3 |
| 0.65 | do | 1.2 |

From these and other examples, I have found that there is a critical interrelation of temperature and hydrogen and hydrocarbon partial pressures as defined by the shaded region of the drawing which constitutes a region of maximum catalyst activity and minimum catalyst aging rate. These relationships, however, are applicable only to catalysts having a palladium concentration in the range of 0.50 to 0.75% wt. containing 0–5% fluorine, and then only when used in the isomerization of a n-hexane feed containing about 20–35% vol. of other hydrocarbons, principally cyclohexane, methylcyclopentane, and isoheptane. In considering the range of conditions specified in the shaded area of the drawing, it is seen that the hydrogen partial pressure lies in the range from about 450 to 500 p.s.i.a. Hydrogen pressures below about 450 p.s.i.a. result in catalyst aging at temperatures greater than 715° F., while hydrogen partial pressures above 500 p.s.i.a. decrease the isomerization rate and tend to cause catalyst fouling. The partial pressure of the n-hexane feed lies in the range from about 100 to 125 p.s.i.a. A substantial increase in hyrocarbon partial pressure above 125 p.s.i.a. increases the isomerization rate, but also increases the catalyst aging rate, while a decrease in pressure below 100 p.s.i.a. decreases isomerization rate and, at low total pressure, causes catalyst fouling. The reaction temperature lies in the range from about 700 to 715° F. at temperatures above 715° F., the isomerization rate is increased but the catalyst aging rate is increased. When the reaction temperature is decreased below 700° F., the catalyst aging rate is increased at low hydrogen pressures and the isomerization reaction rate declines rapidly.

The space velocity of hydrocarbon feed is not critical and may vary from as low as 0.01 to as high as 50 or more, a range of 3–6 LWHSV being preferred.

While I have described my invention with special emphasis upon one or more specific embodiments, I wish it to be understood that within the scope of the appended claims this invention may be practiced otherwise than as specifically described.

The embodiments of the invention in which an exclusive property or privilege is claimed are defined as follows:

1. A process for isomerization of a sulfur-free hydrocarbon feed consisting essentially of n-hexane containing 20–35% vol. of other hydrocarbons comprising cyclohexane and methylcyclopentane and minor amounts of heptanes as impurities, which comprises contacting said hydrocarbon feed and hydrogen with a catalyst consisting essentially of 0.50–0.75% wt. palladium on silica-alumina, containing 70–90% silica, having 0–5% combined fluorine, at a hydrogen partial pressure of 450–500 p.s.i.a., a hydrocarbon partial pressure of 100–125 p.s.i.a., and temperature of 700–715° F., all lying within the shaded wedge, A—B—C—D—E, in the three-dimensional graph shown in the drawing, said process being characterized by a high reaction rate constant which remains substantially constant for periods of operation in excess of 100 hours.

2. A process in accordance with claim 1 in which the catalyst support is 75/25 silica-alumina.

3. A process in accordance with claim 1 in which the catalyst support is 87/13 silica-alumina.

4. A process in accordance with claim 1 in which the catalyst support contains about 2% fluorine added as a fluorine-containing acid.

5. A process in accordance with claim 4 in which the catalyst comprises 0.65% palladium on 75/25 silica-alumina.

6. A process in accordance with claim 4 in which the catalyst comprises 0.65% palladium on 87/13 silica-alumina.

References Cited in the file of this patent
UNITED STATES PATENTS

| | | |
|---|---|---|
| 2,629,683 | Haensel | Feb. 24, 1953 |
| 2,831,908 | Starnes et al. | Apr. 22, 1958 |
| 2,834,823 | Patton et al. | May 13, 1958 |
| 2,905,736 | Belden | Sept. 22, 1959 |
| 2,906,798 | Starnes et al. | Sept. 29, 1959 |
| 2,925,453 | Folkins et al. | Feb. 16, 1960 |

UNITED STATES PATENT OFFICE
CERTIFICATE OF CORRECTION

Patent No. 3,023,256                        February 27, 1962

Norman L. Carr

It is hereby certified that error appears in the above numbered patent requiring correction and that the said Letters Patent should read as corrected below.

Column 5, line 30, for "78" read -- 87 --; column 8, line 20, for "consisting essentially of" read -- comprising --; line 21, for "comprising" read -- consisting essentially of --.

Signed and sealed this 3rd day of July 1962.

(SEAL)
Attest:

ERNEST W. SWIDER
Attesting Officer

DAVID L. LADD
Commissioner of Patents